(12) United States Patent
Su et al.

(10) Patent No.: US 11,841,576 B2
(45) Date of Patent: Dec. 12, 2023

(54) SPHERICAL SCREEN MODULE UNIT AND SPHERICAL SCREEN STRUCTURE ASSEMBLED BY THE SAME

(71) Applicant: Brogent Technologies Inc., Kaohsiung (TW)

(72) Inventors: Pei-Te Su, Kaohsiung (TW); Kuan-Chih Liu, Kaohsiung (TW); Tak-Hon Lee, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 584 days.

(21) Appl. No.: 17/135,091

(22) Filed: Dec. 28, 2020

(65) Prior Publication Data

US 2022/0091461 A1 Mar. 24, 2022

(30) Foreign Application Priority Data

Sep. 18, 2020 (TW) .................................. 109132246

(51) Int. Cl.
| | |
|---|---|
| *G03B 21/60* | (2014.01) |
| *G06F 3/14* | (2006.01) |
| *E04H 3/28* | (2006.01) |
| *G02F 1/13357* | (2006.01) |
| *A63J 25/00* | (2009.01) |

(52) U.S. Cl.
CPC ........ *G02F 1/133603* (2013.01); *A63J 25/00* (2013.01); *E04H 3/28* (2013.01); *G03B 21/60* (2013.01); *G06F 3/1446* (2013.01)

(58) Field of Classification Search
CPC .. G03B 21/56–625; G09F 9/302–3026; E04H 3/24; E04H 3/28
See application file for complete search history.

(56) References Cited

U.S. PATENT DOCUMENTS

| 5,097,640 A * | 3/1992 | Skolnick | G09F 19/18 |
| | | | 52/81.3 |
| 10,838,293 B2 * | 11/2020 | Liu | G03B 21/14 |
| 11,487,195 B2 * | 11/2022 | Tamura | G03B 21/58 |
| 2011/0249330 A1 * | 10/2011 | Anderson | G03B 21/62 |
| | | | 359/460 |

\* cited by examiner

*Primary Examiner* — Leon W Rhodes, Jr.
(74) *Attorney, Agent, or Firm* — Birch, Stewart, Kolasch & Birch, LLP

(57) ABSTRACT

A spherical screen module unit includes a sector base including a sector carrier having an inner and outer arc edges; arc length of the outer arc edge is greater than that of the inner arc edge. An inner ramp frame is on the sector carrier and closer to the inner arc edge; an outer ramp frame is on the sector carrier and closer to the outer arc edge. When the spherical screen module unit is on a spherical screen assembling surface, minimum distance between the inner ramp frame upper surface and the spherical screen assembling surface is first height; maximum distance between the outer ramp frame upper surface and the spherical screen assembling surface is second height which is greater than the first height. A spherical screen structure including spherical screen module unit facilitates the module unit disassembly for repair, maintenance, or angle adjustment, and increases applicability in different environments.

16 Claims, 10 Drawing Sheets

SPHERICAL SCREEN MODULE UNIT AND SPHERICAL SCREEN STRUCTURE ASSEMBLED BY THE SAME

BACKGROUND

1. Technical Field

The present disclosure relates generally to a spherical screen structure, and more particularly to a spherical screen module unit and a spherical screen structure assembled by the spherical screen module unit.

2. Description of Related Art

With the development of technology, people have more demand and higher requirements for video entertainment, including high image quality and large screen, and even immersive sound and light effect.

Therefore, related industries have developed a technology to play high-definition videos with a spherical screen structure to provide viewers with immersive sound and light effects. In the conventional spherical screen structure, concave arc walls of buildings are used as the projection spherical screen. However, the buildings cannot be moved, so the needs of viewers in various regions cannot be satisfied.

Then, the related industries have successively developed skeleton spherical screen structures. Furthermore, in order to facilitate repair, maintenance, or angle adjustment, there is a basic height reserved in the conventional skeleton spherical screen structure for the staff to enter and exit. Nevertheless, such conventional skeleton spherical screen structure may not be easily implemented in an environment with limited height.

Besides, the conventional skeleton spherical screen structure is assembled by multiple main longitudinal bones, secondary longitudinal bones, and transverse bones. When a display element on the spherical screen needs to be repaired, maintained, or adjusted, some of the main longitudinal bones, secondary longitudinal bones, and transverse bones have to be disassembled first.

Thus, the conventional skeleton spherical screen structure is limited by the height of the environment, and moreover, there are many inconveniences in repairing, maintaining, or adjusting the angle. Accordingly, a novel spherical screen module unit and a novel spherical screen structure assembled by said spherical screen module unit are needed to improve the long-existing shortcomings of the abovementioned conventional skeleton spherical screen structure.

BRIEF SUMMARY OF THE DISCLOSURE

In view of the above, the present disclosure provides a spherical screen module unit and a spherical screen structure assembled by the spherical screen module unit in order to facilitate the disassembly of the module unit for the following repair, maintenance, or angle adjustment of the spherical screen structure. In addition, the spherical screen module unit and the spherical screen structure have lower basic height, and thus can be successfully set up in an environment with limited height, which significantly increases the applicability of the spherical screen structure provided by the present disclosure in different environments.

The present disclosure provides a spherical screen module unit including a sector base, at least one inner ramp frame, and at least one outer ramp frame; the sector base includes a sector carrier and at least one support post. The sector carrier has an inner arc edge and an outer arc edge, which are formed on opposite sides of the sector carrier; an arc length of the outer arc edge is greater than an arc length of the inner arc edge; the support post is provided under the sector carrier. The inner ramp frame is provided for holding a display device and is provided on the sector carrier; compared with the outer arc edge of the sector carrier, the inner ramp frame is closer to the inner arc edge. The outer ramp frame is provided for holding the display device and is provided on the sector carrier; compared with the inner arc edge of the sector carrier, the outer ramp frame is closer to the outer arc edge. When the spherical screen module unit is provided on a spherical screen assembling surface, there is a minimum distance between an upper surface of the inner ramp frame and the spherical screen assembling surface, which is defined as a first height, and a maximum distance between an upper surface of the outer ramp frame and the spherical screen assembling surface is defined as a second height, wherein the second height is greater than the first height.

The present disclosure further provides a spherical screen structure including a plurality of first spherical screen module units and a plurality of second spherical screen module units. Each of the first spherical screen module units constitutes a first sector structure; the first sector structures are arranged around a center of circle and connected to each other; each of the first sector structures has a first inner arc edge and a first outer arc edge, which are formed on opposite sides of a first sector base, wherein an arc length of the first outer arc edge is greater than an arc length of the first inner arc edge. When the first spherical screen module units are provided on a spherical screen assembling surface, there is a minimum distance between an upper surface of the first inner arc edge and the spherical screen assembling surface, which is defined as a first height, and a maximum distance between an upper surface of the first outer arc edge and the spherical screen assembling surface is defined as a second height, wherein the second height is greater than the first height. Each of the second spherical screen module units constitutes a second sector structure; the second sector structures are arranged around the center of circle and connected to each other; each of the second sector structures has a second inner arc edge and a second outer arc edge, which are formed on opposite sides of a second sector base, wherein an arc length of the second outer arc edge is greater than an arc length of the second inner arc edge; each of the second spherical screen module units is connected to the first spherical screen module unit which is corresponding to the second spherical screen module unit, and the second inner arc edge of each of the second sector structures is connected to the first outer arc edge of the first sector structure which is corresponding to the second sector structure. When the first spherical screen module units and the second spherical screen module units are arranged on the spherical screen assembling surface, the minimum distance between the upper surface of the first inner arc edge and the spherical screen assembling surface is defined as the first height, and there is a maximum distance between an upper surface of the second outer arc edge and the spherical screen assembling surface, which is defined as a third height; the third height is greater than the first height.

The effect of the present disclosure is that, the spherical screen module unit and the spherical screen structure assembled by the spherical screen module unit facilitates the disassembly of the module unit for the following repair, maintenance, or angle adjustment of the spherical screen structure. Additionally, the spherical screen module unit and the spherical screen structure have lower basic height, and thus can be successfully set up in an environment with limited height, which significantly increases the applicability of the spherical screen structure provided by the present disclosure in different environments.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE DISCLOSURE

Figure 1A:
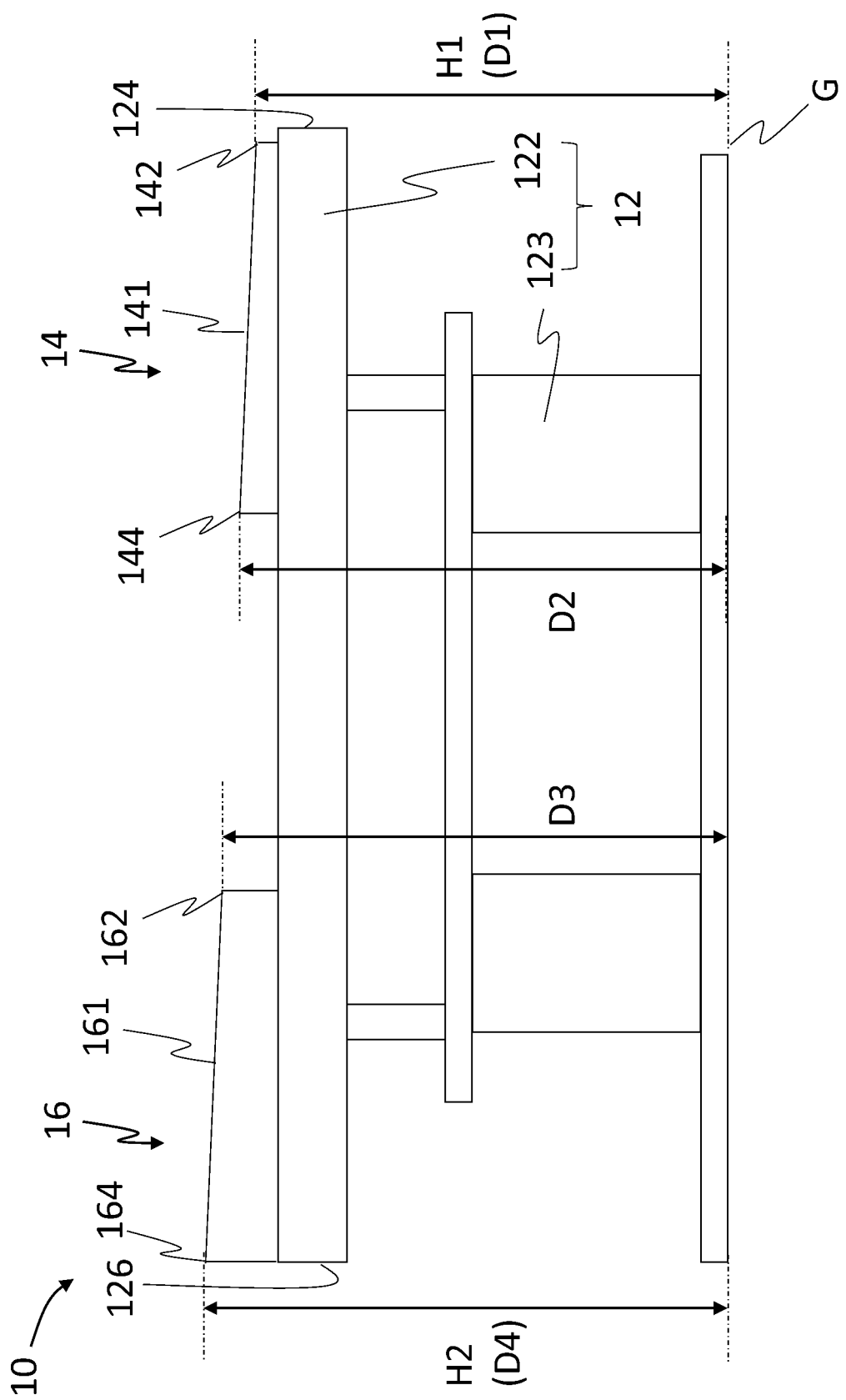
FIG. 1A is a lateral view of the spherical screen module unit of an embodiment of the present disclosure.
Figure 2:
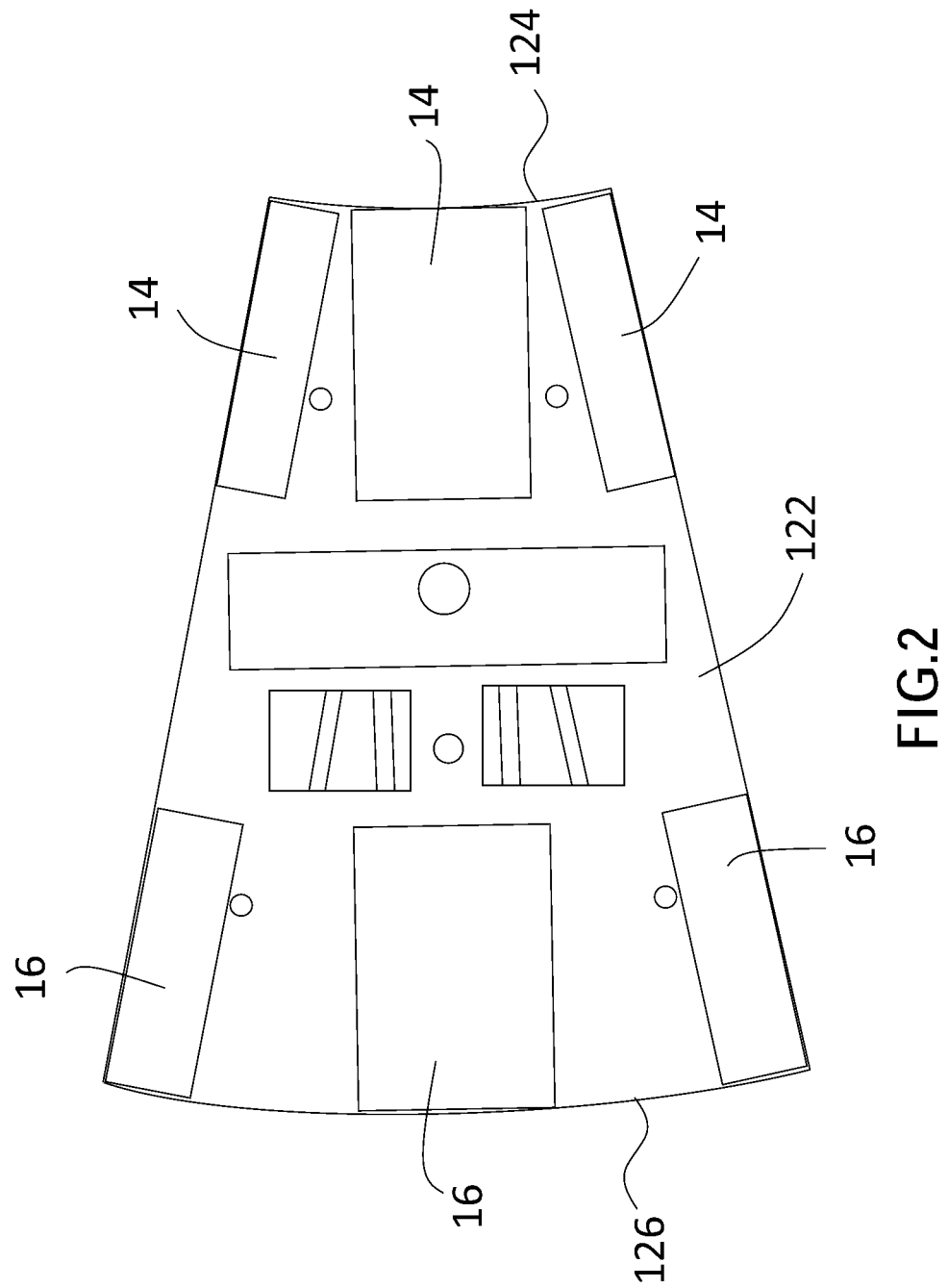
FIG. 2 is a top view of the spherical screen module unit in FIG. 1A.

As shown in FIG. 1A and FIG. 2, FIG. 1A is a lateral view of a spherical screen module unit 10 of the first embodiment of the present disclosure, and FIG. 2 is a top view of the spherical screen module unit 10 in FIG. 1A.

The spherical screen module unit 10 includes a sector base 12, at least one inner ramp frame 14, and at least one outer ramp frame 16. The sector base 12 includes a sector carrier 122 and at least one support post 123.

The sector carrier 122 has an inner arc edge 124 and an outer arc edge 126 opposite to each other. The arc length of the outer arc edge 126 is greater than the arc length of the inner arc edge 124. The at least one support post 123 is located under the sector carrier 122. In an embodiment, the inner arc edge 124 and the outer arc edge 126 share the same center of a circle; in other words, the radian of the inner arc edge 124 is the same as the radian of the outer arc edge 126.

The at least one inner ramp frame 14 is provided for holding a display device (not shown), and is located on the sector carrier 122. Moreover, compared with the outer arc edge 126 of the sector carrier 122, the inner ramp frame 14 is closer to the inner arc edge 124. The at least one outer ramp frame 16 is provided for holding the display device (not shown), and is located on the sector carrier 122. Furthermore, compared with the inner arc edge 124 of the sector carrier 122, the outer ramp frame 16 is closer to the outer arc edge 126. In an embodiment, the display device includes a plurality of light emitting diode (LED) display units, at least one projection curtain, or the combination thereof. Each of the LED display units is set on the inner ramp frame 14, the outer ramp frame 16, or the combination thereof, so as to form a spherical image. The projection curtain is laid on the inner ramp frame 14, the outer ramp frame 16, or the combination thereof, and further matches at least one projection light source to display another spherical image.

When the spherical screen module unit 10 is set on a spherical screen assembling surface G, there is a minimum distance between an upper surface 141 of the inner ramp frame 14 and the spherical screen assembling surface G, defined as a first height H1. Additionally, there is a maximum distance between an upper surface 161 of the outer ramp frame 16 and the spherical screen assembling surface G, defined as a second height H2. The second height H2 is greater than the first height H1. In an embodiment, the inner ramp frame 14 slopes downward from the outer arc edge 126 of the sector carrier 122 to the inner arc edge 124, and the outer ramp frame 16 also slopes downward from the outer arc edge 126 of the sector carrier 122 to the inner arc edge 124.

In an embodiment, the inner ramp frame 14 has an inner lateral side 142 and an outer lateral side 144 opposite to each other. The inner lateral side 142 is substantially parallel to the inner arc edge 124 of the sector carrier 122. Compared with the outer arc edge 126, the inner lateral side 142 is closer to the inner arc edge 124. The outer lateral side 144 is substantially parallel to the outer arc edge 126 of the sector carrier 122. Compared with the inner arc edge 124, the outer lateral side 144 is closer to the outer arc edge 126. When the spherical screen module unit 10 is set on the spherical screen assembling surface G, there is a first distance D1 between the inner lateral side 142 and the spherical screen assembling surface G, and a second distance D2 is between the outer lateral side 144 and the spherical screen assembling surface G. In an embodiment, the second distance D2 is greater than the first distance D1.

In an embodiment, the outer ramp frame 16 has an inner lateral side 162 and an outer lateral side 164, which are opposite to each other. The inner lateral side 162 is substantially parallel to the inner arc edge 124 of the sector carrier 122. Compared with the outer arc edge 126, the inner lateral side 162 is closer to the inner arc edge 124. The outer lateral side 164 is substantially parallel to the outer arc edge 126 of the sector carrier 122. Compared with the inner arc edge 124, the outer lateral side 164 is closer to the outer arc edge 126. When the spherical screen module unit 10 is set on the spherical screen assembling surface G, there is a third distance D3 between the inner lateral side 162 and the spherical screen assembling surface G, and a fourth distance D4 is between the outer lateral side 164 and the spherical screen assembling surface G. In an embodiment, the fourth distance D4 is larger than the third distance D3.

Figure 1B:
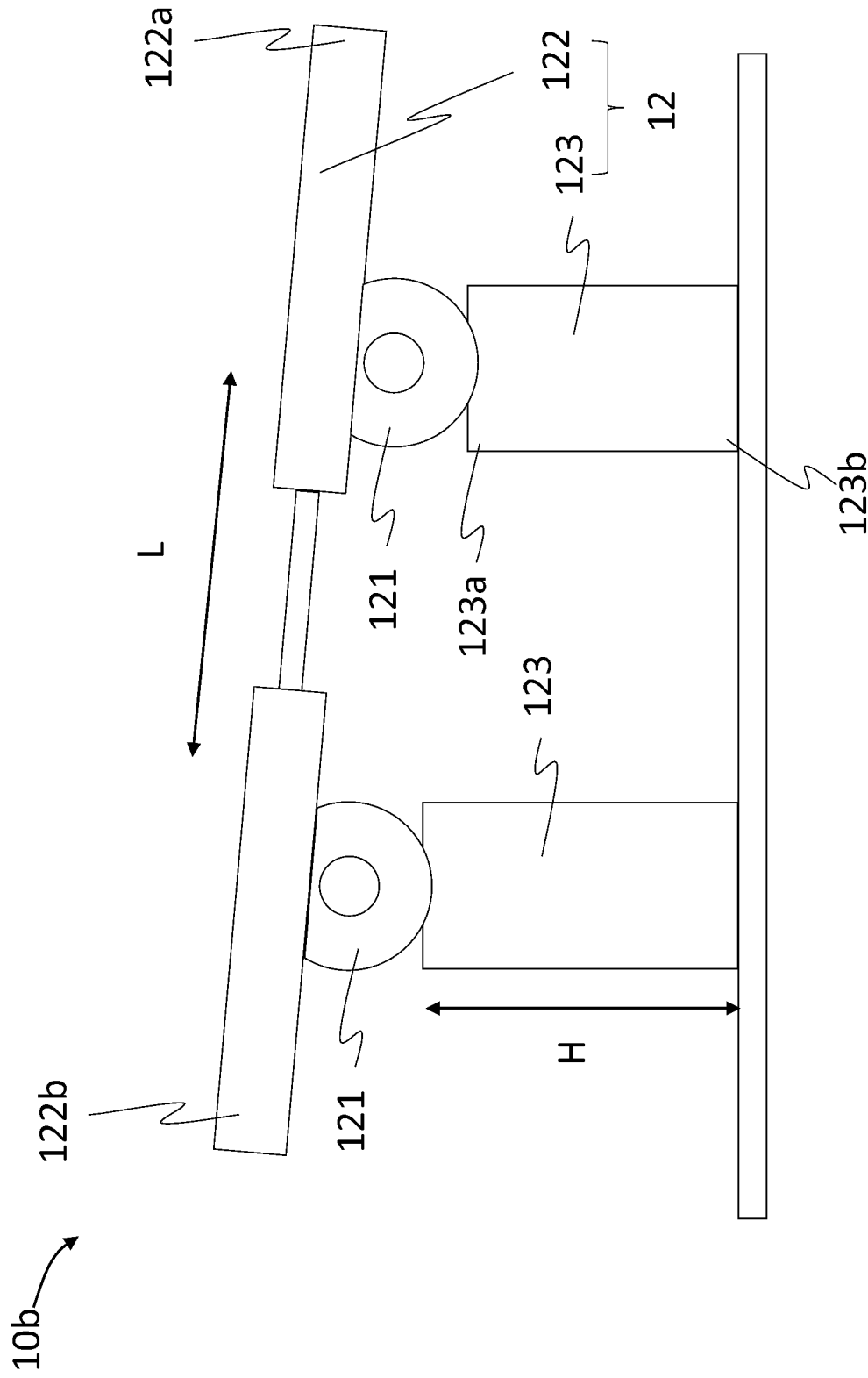
FIG. 1B is a lateral view of the spherical screen module unit of another embodiment of the present disclosure.

As shown in FIG. 1B, a lateral view of the spherical screen module unit 10b of another embodiment of the present disclosure in illustrated. In this figure, the spherical screen module unit 10b includes a sector base 12 which includes a sector carrier 122 and at least one support post 123.

In an embodiment, the sector carrier 122 includes a first portion 122a and a second portion 122b, which are movable with respect to each other for adjusting a length L of the sector carrier 122. The at least one support post 123 are disposed under the sector carrier 122. In an embodiment, the at least one support post 123 has an upper portion 123a and a lower portion 123b, which are movable with respect to each other for adjusting a height H of the at least one support post 123.

In FIG. 1B, the number of the at least one support post 123 is more than one. Moreover, the support posts 123 are pivotably connected to the sector carrier 122 through pivots 121 respectively. Additionally, one of the support posts has the height different from the height of another one of the support posts.

Figure 3:
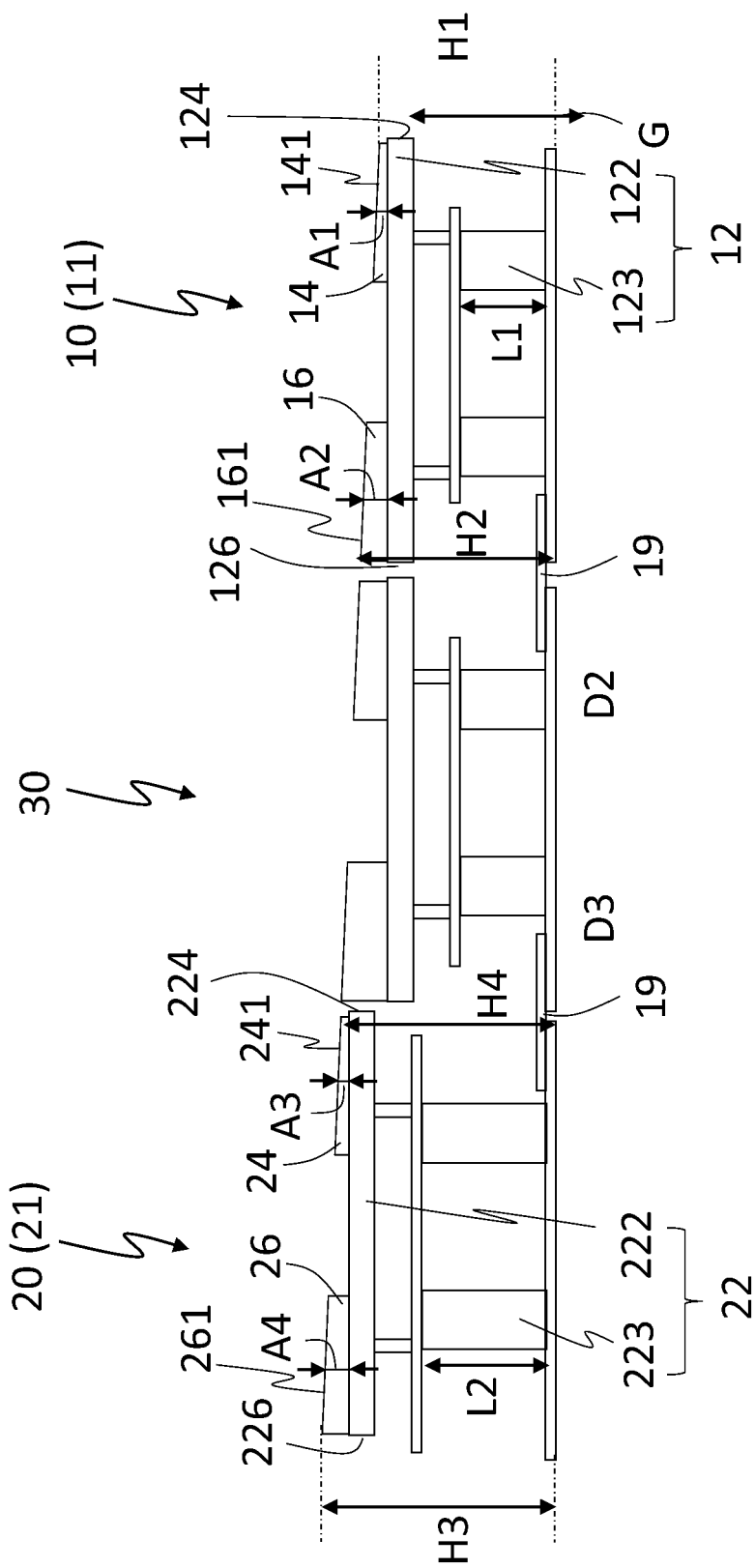
FIG. 3 is a lateral view of the connected spherical screen module units in FIG. 1A.
Figure 4:
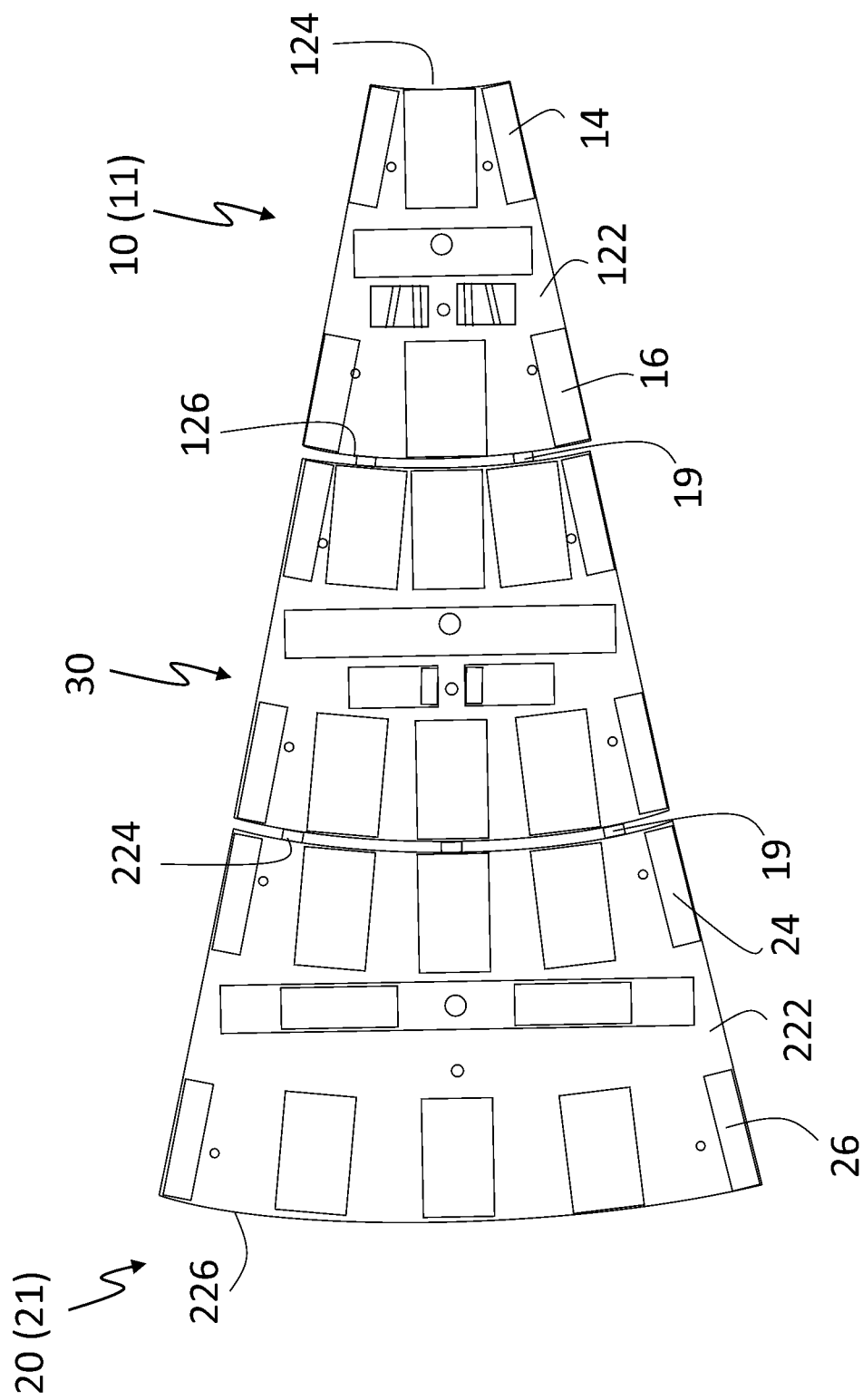
FIG. 4 is a top view of FIG. 3.

As shown in FIG. 3 and FIG. 4, FIG. 3 is a lateral view of the connection configuration of the spherical screen module units of an embodiment, and FIG. 4 is a top view of FIG. 3.

The connection configuration of the spherical screen module units includes that a first spherical screen module unit 10 and a second spherical screen module unit 20 are connected in sequence. In an embodiment, the first spherical screen module unit 10 is the abovementioned spherical screen module unit 10. In an embodiment of the present disclosure, the first spherical screen module unit 10 and the second spherical screen module unit 20 are connected by a connector 19.

There is a plurality of first spherical screen module units 10, and each of the first spherical screen module units 10 constitutes a first sector structure 11. The plurality of first sector structures 11 are arranged around a center of a circle and connected to each other. In an embodiment, two adjacent first sector structures 11 are connected by the connector 19.

Each of the first sector structures 11 has a first inner arc edge 124 (i.e., the inner arc edge 124) and a first outer arc edge 126 (i.e., the outer arc edge 126), which are formed on two opposite sides of the first sector base 12 (i.e., the sector base 12). The arc length of the first outer arc edge 126 is larger than the arc length of the first inner arc edge 124. When the first spherical screen module units 10 are set on the spherical screen assembling surface G, there is a minimum distance between an upper surface of the first inner arc edge 124 and the spherical screen assembling surface G, which is defined as the first height H1. There is a maximum distance between an upper surface of the first outer arc edge 126 and the spherical screen assembling surface G defined as the second height H2. The second height H2 is greater than the first height H1.

There is a plurality of second spherical screen module units 20, and each of the second spherical screen module units 20 constitutes a second sector structure 21. The plurality of second sector structures 21 are arranged around the center of the circle and connected to each other. In an embodiment, two adjacent second sector structures 21 are connected by the connector 19.

Each of the second sector structures 21 has a second inner arc edge 224 and a second outer arc edge 226 formed on two opposite sides of the second sector base 22. The arc length of the second outer arc edge 226 is larger than the arc length of the second inner arc edge 224. Each of the second spherical screen module units 20 is connected to the corresponding first spherical screen module unit 10, and the second inner arc edge 224 of each second sector structure 21 is connected to the first outer arc edge 126 of the corresponding first sector structure 11. As illustrated in FIG. 3 and FIG. 4, the connection configuration of the spherical screen module units includes that the first spherical screen module unit 10, a third spherical screen module unit 30, and the second spherical screen module unit 20 are connected in sequence. The third spherical screen module unit 30 is located between the first spherical screen module unit 10 and the second spherical screen module unit 20. In an embodiment, the first spherical screen module unit 10, the third spherical screen module unit 30, and the second spherical screen module unit 20 are connected by the connector 19.

When the first spherical screen module units 10 and the second spherical screen module units 20 are arranged on the spherical screen assembling surface G, there is a minimum distance between the upper surface of the first inner arc edge 124 and the spherical screen assembling surface G defined as the first height H1. Additionally, there is a maximum distance between an upper surface of the second outer arc edge 226 and the spherical screen assembling surface G defined as a third height H3. The third height H3 is larger than the first height H1.

In an embodiment, each of the first sector structures 11 includes a first sector base 12 (i.e., the sector base 12), at least one first inner ramp frame 14 (i.e., the inner ramp frame 14), and at least one first outer ramp frame 16 (i.e., the outer ramp frame 16). The first sector base 12 has the first inner arc edge 124 and the first outer arc edge 126.

The at least one first inner ramp frame 14 is provided for holding a display device (not shown), and is located on the first sector base 12. Moreover, compared with the first outer arc edge 126 of the first sector base 12, the first inner ramp frame 14 is closer to the first inner arc edge 124. There is a minimum distance between the upper surface 141 of the first inner ramp frame 14 and the spherical screen assembling surface G, which is defined as the first height H1.

The at least one first outer ramp frame 16 is provided for holding the display device (not shown), and is located on the first sector base 12. Moreover, compared with the first inner arc edge 124 of the first sector base 12, the first outer ramp frame 16 is closer to the first outer arc edge 126. There is a maximum distance between the upper surface 161 of the first outer ramp frame 16 and the spherical screen assembling surface G defined as the second height H2. The second height H2 is greater than the first height H1.

In an embodiment, each of the second sector structures 20 includes a second sector base 22, at least one second inner ramp frame 24, and at least one second outer ramp frame 26. The second sector base 22 has the second inner arc edge 224 and the second outer arc edge 226. In the embodiment of the present disclosure, the second inner arc edge 224 is greater than or equal to the first outer arc edge 126.

The at least one second inner ramp frame 24 is provided for holding the display device (not shown), and is located on the second sector base 22. In addition, compared with the second outer arc edge 226 of the second sector base 22, the second inner ramp frame 24 is closer to the second inner arc edge 224. There is a minimum distance between an upper surface 241 of the second inner ramp frame 24 and the spherical screen assembling surface G defined as a fourth height H4. In an embodiment, the fourth height H4 is greater than or equal to the second height H2.

The at least one second outer ramp frame 26 is provided for holding the display device (not shown), and is located on the second sector base 22. Furthermore, compared with the second inner arc edge 224 of the second sector base 22, the second outer ramp frame 26 is closer to the second outer arc edge 226. There is a maximum distance between an upper surface 261 of the second outer ramp frame 26 and the spherical screen assembling surface G defined as the third height H3. The third height H3 is greater than the fourth height H4.

In an embodiment, the first sector base 12 includes a first sector carrier 122 and at least one first support post 123. The first sector carrier 122 has the first inner arc edge 124 and the first outer arc edge 126. The at least one first support post 123 is set under the first sector carrier 122, and has a first support height L1. The second sector base 22 includes a second sector carrier 222 and at least one second support post 223. The second sector carrier 222 has the second inner arc edge 224 and the second outer arc edge 226. The at least one second support post 223 is set under the second sector carrier 222, and has a second support height L2. The second support height L2 is greater than or equal to the first support height L1.

In an embodiment, the first inner ramp frame 14 has an first average height A1 between the upper surface 141 of the first inner ramp frame 14 and the first sector carrier 122; the first outer ramp frame 16 has a second average height A2 between the upper surface 161 and the first sector carrier 122; the second inner ramp frame 24 has a third average height A3 between the upper surface 241 and the second sector carrier 222; the second outer ramp frame 26 has a fourth average height A4 between the upper surface 261 and the second sector carrier 222. The second average height A2 is greater than the first average height A1; the fourth average height A4 is greater than the third average height A3; the third average height A3 is greater than or equal to the first average height A1; the fourth average height A4 is greater than or equal to the second average height A2.

Figure 5:
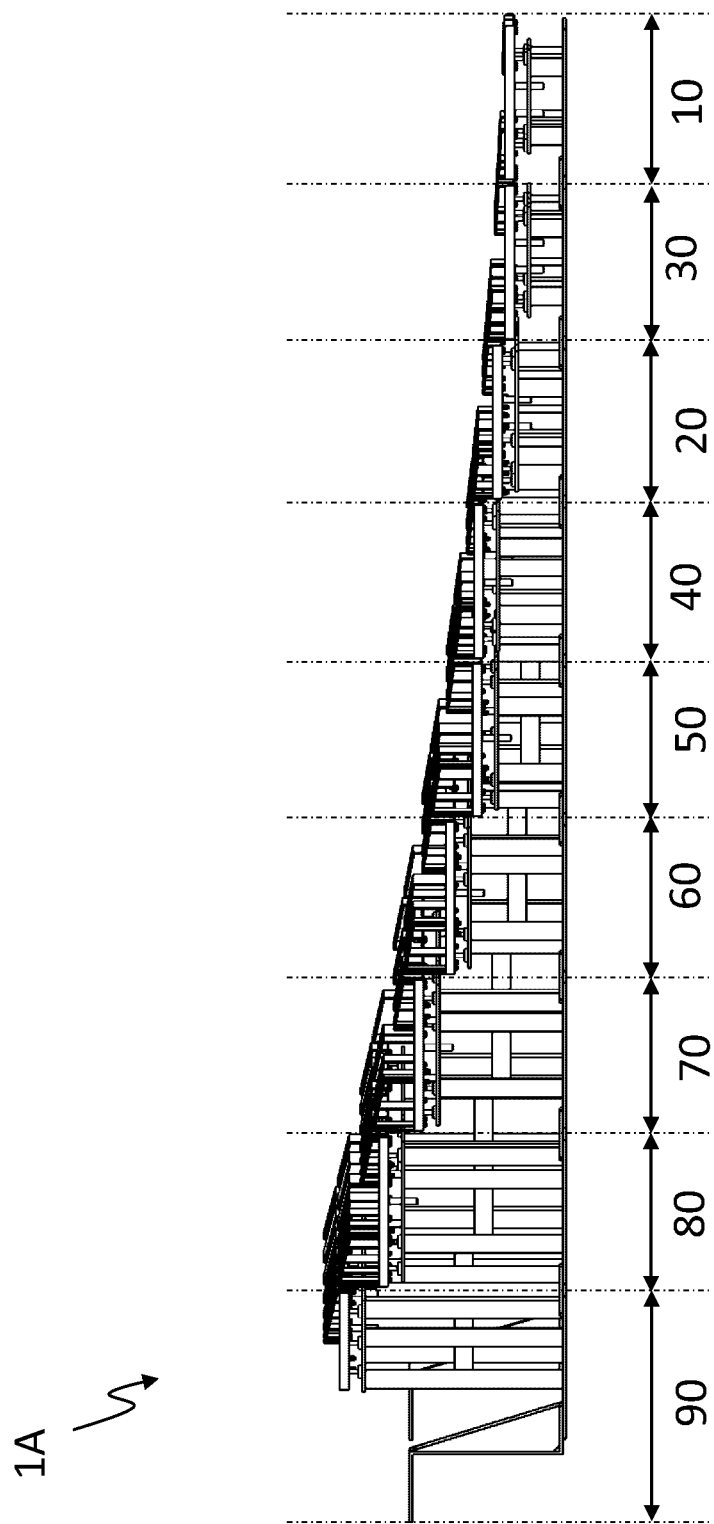
FIG. 5 is a lateral view of the partial spherical screen structure of the first embodiment.
Figure 6:
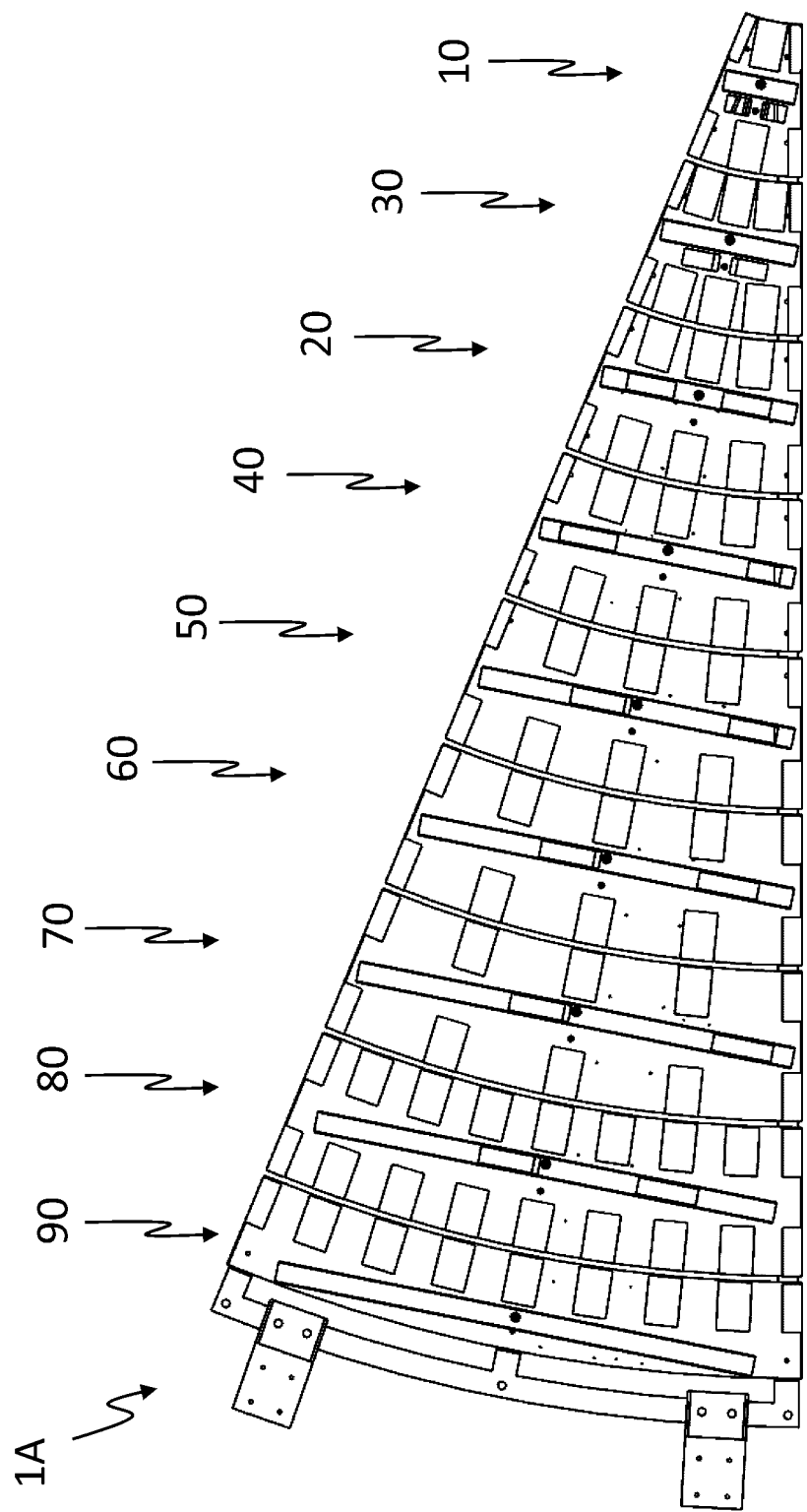
FIG. 6 is a top view of FIG. 5.

As depicted in FIG. 5 and FIG. 6, FIG. 5 is a lateral view of a partial spherical screen structure 1A of the first embodiment, and FIG. 6 is a top view of FIG. 5.

The partial spherical screen structure 1A includes the first spherical screen module unit 10, the third spherical screen module unit 30, the second spherical screen module unit 20, a fourth spherical screen module unit 40, a fifth spherical screen module unit 50, a sixth spherical screen module unit 60, a seventh spherical screen module unit 70, an eighth spherical screen module unit 80, and a ninth spherical screen module unit 90, which are connected in sequence. In an embodiment, the first spherical screen module unit 10, the third spherical screen module unit 30, the second spherical screen module unit 20, the fourth spherical screen module unit 40, the fifth spherical screen module unit 50, the sixth spherical screen module unit 60, the seventh spherical screen module unit 70, the eighth spherical screen module unit 80, and the ninth spherical screen module unit 90 are connected by the connector 19.

The third spherical screen module unit 30 is connected to the corresponding first spherical screen module unit 10; the second spherical screen module unit 20 is connected to the corresponding third spherical screen module unit 30; the fourth spherical screen module unit 40 is connected to the corresponding second spherical screen module unit 20; the fifth spherical screen module unit 50 is connected to the corresponding fourth spherical screen module unit 40; the sixth spherical screen module unit 60 is connected to the corresponding fifth spherical screen module unit 50; the seventh spherical screen module unit 70 is connected to the corresponding sixth spherical screen module unit 60; the eighth spherical screen module unit 80 is connected to the corresponding seventh spherical screen module unit 70; the ninth spherical screen module unit 90 is connected to the corresponding eighth spherical screen module unit 80.

Figure 7:
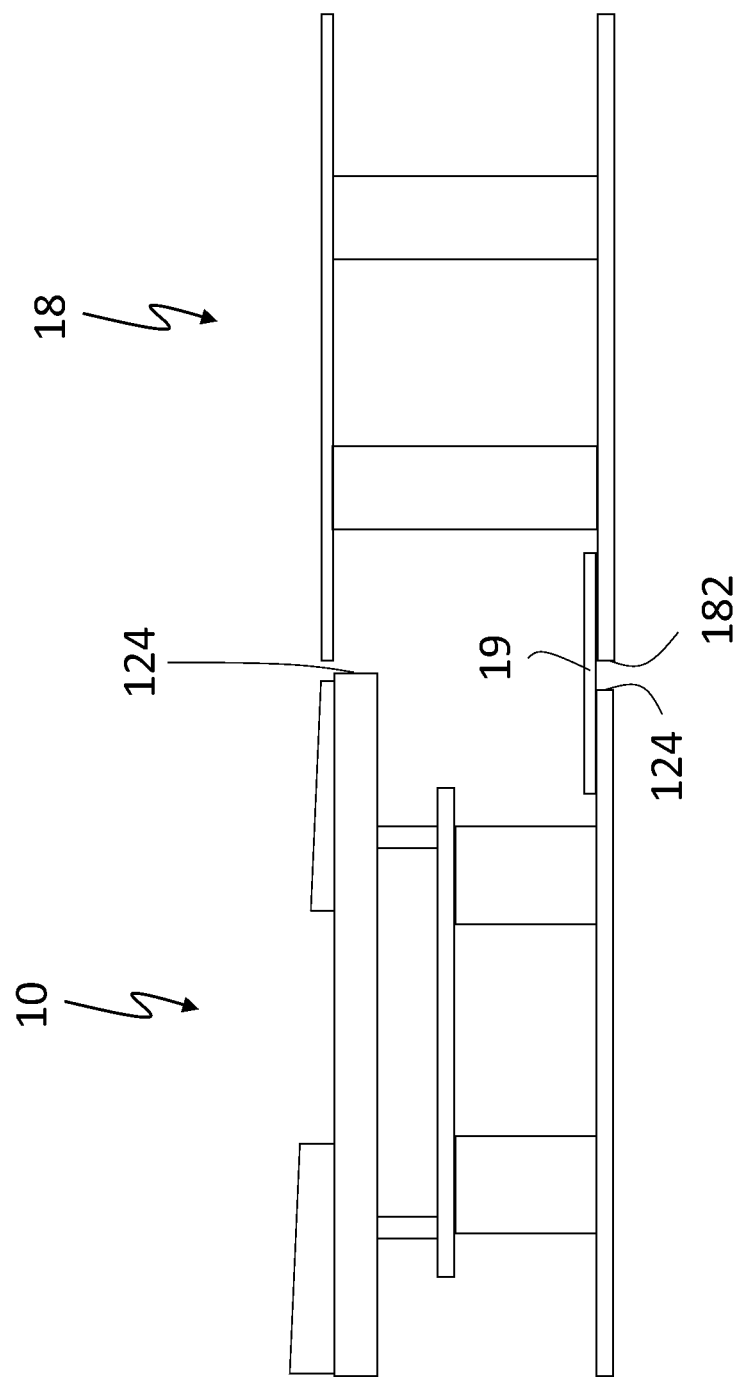
FIG. 7 is a lateral view of the spherical screen module unit of the first embodiment which is connected to the center platform.
Figure 8:
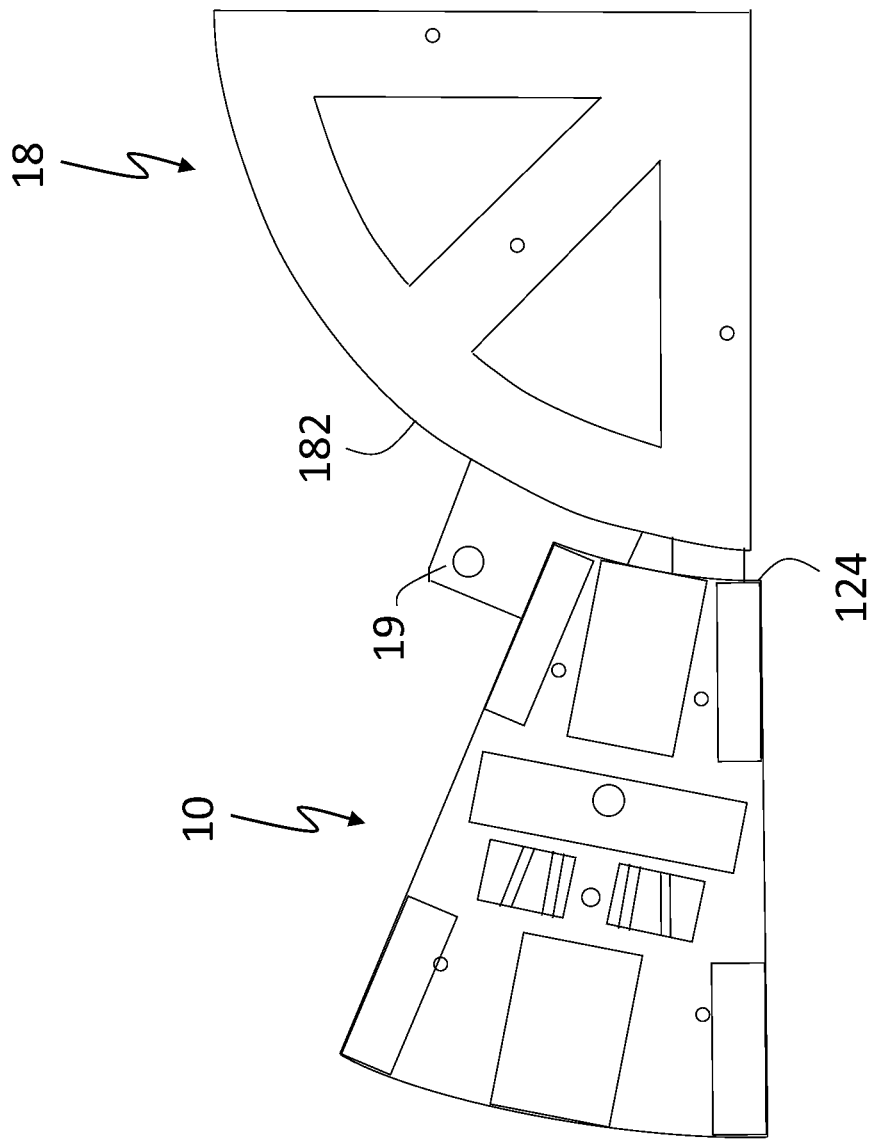
FIG. 8 is a top view of FIG. 7.

As shown in FIG. 7 and FIG. 8, FIG. 7 is a lateral view of the spherical screen module unit 10 connected to a center platform, and FIG. 8 is a top view of FIG. 7.

In FIG. 7 and FIG. 8, the center platform 18 can be a quarter circle sector structure, and the spherical screen module unit 10 can be a sector structure of one-sixteenth arc. The inner arc edge 124 of the spherical screen module unit 10 is connected to an arc edge 182 of the center platform 18. In an embodiment of the present disclosure, the center platform 18 and the spherical screen module unit 10 can be sector structures of any arc. In an embodiment, the arc edge 182 of the center platform 18 is connected to the spherical screen module unit 10 by the connector 19, and the arc edge 182 of the center platform 18 can be connected with up to four spherical screen module units 10.

Figure 9:
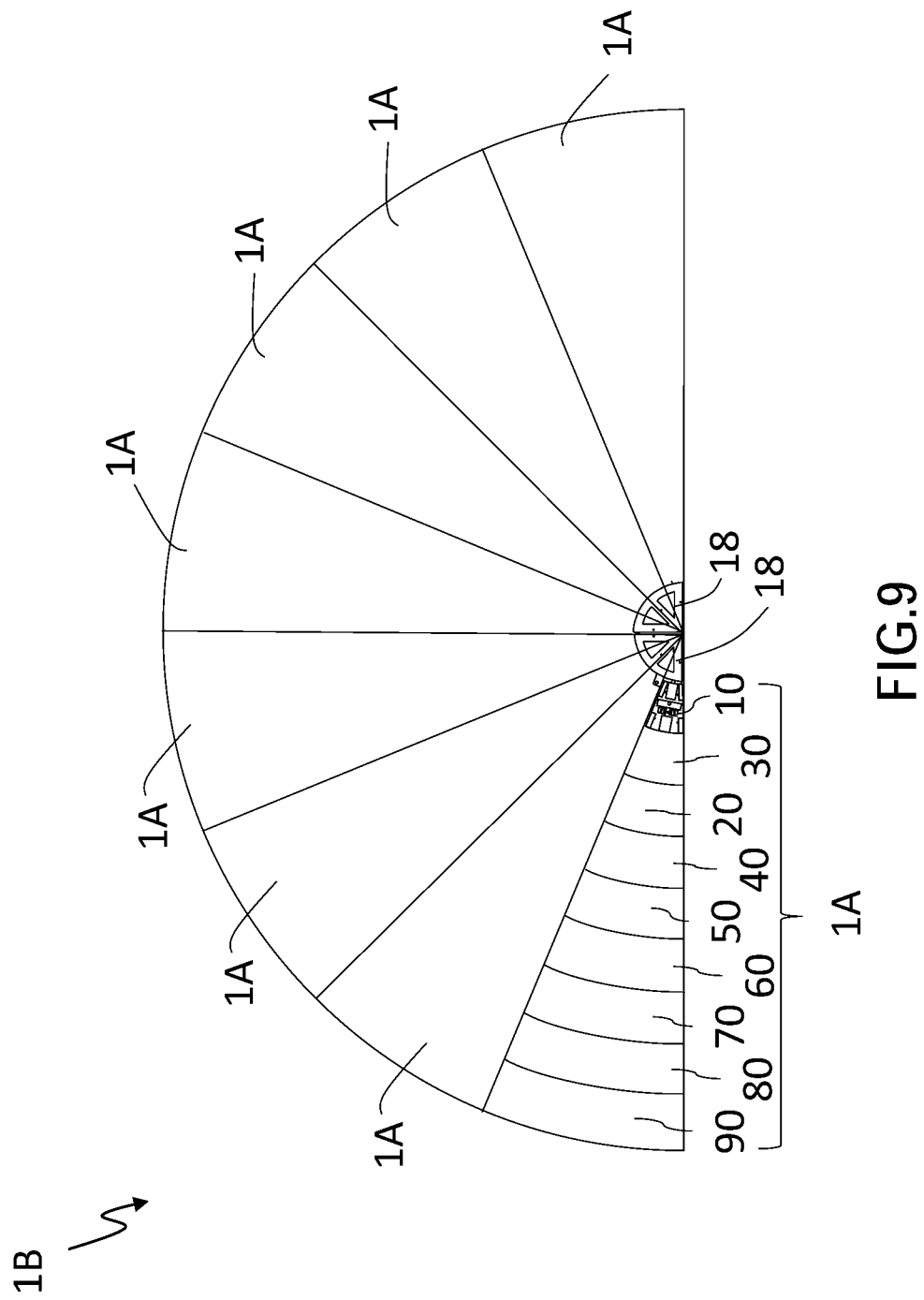
FIG. 9 is a top view of the spherical screen structure of the first embodiment which is semicircular.

As illustrated in FIG. 9, a top view of a semicircular spherical screen structure 1B of an embodiment is shown. The spherical screen structure 1B is assembled by the abovementioned two center platforms 18 and eight spherical screen structures 1A. In another embodiment, the center platform 18 and the spherical screen structure 1A can be assembled in a spherical screen structure with any surface arc.

With the spherical screen module unit and the spherical screen structure assembled by the spherical screen module units, the module units can be easily disassembled to repair, maintain, or adjust the angle of the spherical screen structure. Additionally, the spherical screen module unit and the assembled spherical screen structure have lower basic height, and thus can be successfully set up in an environment with limited height, which significantly increases the applicability of the spherical screen structure provided by the present disclosure in different environments.

It must be noted that the embodiments described above are only embodiments of the present disclosure. All equivalent structures which employ the concepts disclosed in this specification and the appended claims should fall within the scope of the present disclosure.

What is claimed is:

1. A spherical screen module unit, comprising:
   a sector base comprising a sector carrier and at least one support post, wherein the sector carrier has an inner arc edge and an outer arc edge, which are formed on opposite sides of the sector carrier; an arc length of the outer arc edge is greater than an arc length of the inner arc edge, and the at least one support post is provided under the sector carrier;
   at least one inner ramp frame which is provided for holding a display device and is provided on the sector carrier, compared with the outer arc edge of the sector carrier, the inner ramp frame is closer to the inner arc edge; and
   at least one outer ramp frame which is provided for holding the display device and is provided on the sector carrier; compared with the inner arc edge of the sector carrier, the outer ramp frame is closer to the outer arc edge,
   wherein when the spherical screen module unit is provided on a spherical screen assembling surface, a first height is between an upper surface of the inner ramp frame and the spherical screen assembling surface, and a second height is between an upper surface of the outer ramp frame and the spherical screen assembling surface, and the second height is greater than the first height.

2. The spherical screen module unit of claim 1, wherein the inner arc edge and the outer arc edge share a same center of a circle.

3. The spherical screen module unit of claim 1, wherein the inner arc edge and the outer arc edge share a same radian.

4. The spherical screen module unit of claim 1, wherein the inner ramp frame slopes downward from the outer arc edge of the sector carrier to the inner arc edge, and the outer ramp frame slopes downward from the outer arc edge of the sector carrier to the inner arc edge.

5. The spherical screen module unit of claim 4, wherein the inner ramp frame has an inner lateral side and an outer lateral side, which are opposite to each other, the inner lateral side is substantially parallel to the inner arc edge of the sector carrier, and compared with the outer arc edge, the inner lateral side is closer to the inner arc edge, the outer lateral side is substantially parallel to the outer arc edge of the sector carrier, and compared with the inner arc edge, the outer lateral side is closer to the outer arc edge, when the spherical screen module unit is provided on the spherical screen assembling surface, a first distance is between the inner lateral side and the spherical screen assembling surface, and a second distance is between the outer lateral side and the spherical screen assembling surface, wherein the second distance is greater than the first distance.

6. The spherical screen module unit of claim 4, wherein the outer ramp frame has an inner lateral side and an outer lateral side, which are opposite to each other; the inner lateral side is substantially parallel to the inner arc edge of the sector carrier, and compared with the outer arc edge, the inner lateral side is closer to the inner arc edge, the outer lateral side is substantially parallel to the outer arc edge of the sector carrier, and compared with the inner arc edge, the outer lateral side is closer to the outer arc edge, when the spherical screen module unit is provided on the spherical screen assembling surface, a third distance is between the inner lateral side and the spherical screen assembling surface, and a fourth distance is between the outer lateral side and the spherical screen assembling surface, wherein the fourth distance is greater than the third distance.

7. The spherical screen module unit of claim 1, wherein the display device comprises a plurality of LED display units and at least one projection curtain, the LED display units are provided on the inner ramp frame and the outer ramp frame to form a spherical image, the projection curtain is laid on the inner ramp frame and the outer ramp frame, and further matches with at least one projection light source to display another spherical image.

8. The spherical screen module unit of claim 1, wherein the at least one support post includes an upper portion and a lower portion movable with respect to the upper portion so as to adjust a height of the at least one support post.

9. The spherical screen module unit of claim 8, wherein the number of the at least one support post is more than one, and the support posts are pivotably connected to the sector carrier respectively; one of the support posts has the height different from the height of another one of the support posts.

10. The spherical screen module unit of claim 9, wherein the sector carrier includes a first portion and a second portion movable with respect to the first portion so as to adjust a length of the sector carrier.

11. A spherical screen structure, comprising:
a plurality of first spherical screen module units, wherein each of the first spherical screen module units forms a first sector structure, the first sector structures are arranged around a center of a circle and connected to each other, each of the first sector structures has a first inner arc edge and a first outer arc edge, which are formed on opposite sides of a first sector base, wherein an arc length of the first outer arc edge is greater than an arc length of the first inner arc edge, when the first spherical screen module units are provided on a spherical screen assembling surface, a first height is between an upper surface of the first inner arc edge and the spherical screen assembling surface, and a second height is between an upper surface of the first outer arc edge and the spherical screen assembling surface, wherein the second height is greater than the first height; and a plurality of second spherical screen module units, wherein each of the second spherical screen module units forms a second sector structure, the second sector structures are arranged around the center of the circle and connected to each other, each of the second sector structures has a second inner arc edge and a second outer arc edge, which are formed on opposite sides of a second sector base, wherein an arc length of the second outer arc edge is greater than an arc length of the second inner arc edge, each of the second spherical screen module units is connected to the corresponding first spherical screen module unit, and the second inner arc edge of each of the second sector structures is connected to the corresponding first outer arc edge of the first sector structure;
wherein when the second spherical screen module units are arranged on the spherical screen assembling surface, a third height is between an upper surface of the second outer arc edge and the spherical screen assembling surface, wherein the third height is greater than the first height.

12. The spherical screen structure of claim 11, wherein each of the first sector structure comprises:
the first sector base which has the first inner arc edge and the first outer arc edge;
at least one first inner ramp frame which is provided on the first sector base for holding a display device, compared with the first outer arc edge of the first sector base, the first inner ramp frame is closer to the first inner arc edge; and
at least one first outer ramp frame which is provided on the first sector base for holding the display device, compared with the first inner arc edge of the first sector base, the first outer ramp frame is closer to the first outer arc edge,
wherein each of the second sector structure comprises:
the second sector base which has the second inner arc edge and the second outer arc edge;
at least one second inner ramp frame which is provided on the second sector base for holding the display device; compared with the second outer arc edge of the second sector base, the second inner ramp frame is closer to the second inner arc edge, and a fourth height is between an upper surface of the second inner ramp frame and the spherical screen assembling surface; and
at least one second outer ramp frame which is provided on the second sector base for holding the display device, compared with the second inner arc edge of the second sector base, the second outer ramp frame is closer to the second outer arc edge, and the third height is greater than the fourth height.

13. The spherical screen structure of claim 12, wherein the fourth height is greater than or equal to the second height.

14. The spherical screen structure of claim 12, wherein the second inner arc edge is greater than or equal to the first outer arc edge.

15. The spherical screen structure of claim 12, wherein the first sector base comprises:
a first sector carrier which has the first inner arc edge and the first outer arc edge; and
at least one first support post which is provided under the first sector carrier, wherein the first support post has a first support height, and wherein
the second sector base comprises:
a second sector carrier which has the second inner arc edge and the second outer arc edge; and at least one second support post which is provided under the second sector carrier, wherein the second support post has a second support height, and wherein the second support height is greater than or equal to the first support height.

16. The spherical screen structure of claim 12, wherein the first inner ramp frame has a first average height between the upper surface of the first inner ramp frame and a first sector carrier, the first outer ramp frame has a second average height between the upper surface of the first outer ramp frame and the first sector carrier, the second inner ramp frame has a third average height between the upper surface of the second inner ramp frame and the second sector carrier, the second outer ramp frame has a fourth average height between the upper surface of the second outer ramp frame and the second sector carrier, wherein the second average height is greater than the first average height, the fourth average height is greater than the third average height, the third average height is greater than or equal to the first average height, and the fourth average height is greater than or equal to the second average height.

* * * * *